(12) United States Patent
Ishiyama

(10) Patent No.: US 7,809,065 B2
(45) Date of Patent: Oct. 5, 2010

(54) PICTURE ENCODING SYSTEM CONVERSION DEVICE AND ENCODING RATE CONVERSION DEVICE

(75) Inventor: Kiyoshi Ishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 1476 days.

(21) Appl. No.: 11/176,352

(22) Filed: Jul. 8, 2005

(65) Prior Publication Data

US 2005/0243919 A1 Nov. 3, 2005

Related U.S. Application Data

(62) Division of application No. 09/725,689, filed on Nov. 30, 2000, now Pat. No. 6,959,041.

(30) Foreign Application Priority Data

Dec. 3, 1999 (JP) ................................. 11-344876

(51) Int. Cl.
*H04N 7/18* (2006.01)
(52) U.S. Cl. .............................. 375/240.26; 375/240.01
(58) Field of Classification Search ................................
375/240.01–240.29
See application file for complete search history.

(56) References Cited

U.S. PATENT DOCUMENTS 6,201,844 B1 * 3/2001 Bailleul ....................... 375/372

FOREIGN PATENT DOCUMENTS

| JP | 07-107461 | 4/1995 |
|---|---|---|
| JP | 07-288804 | 10/1995 |
| JP | 08-111870 | 4/1996 |
| JP | 08-251587 | 9/1996 |

(Continued)

OTHER PUBLICATIONS

Hiryoyuki Kasai et al., "Study of low delay MPEG-2 video transcoder code rate control schemes," Joho Shori Gakkai Kenkyu Hokoku, Oct. 8, 1999, vol. 99, No. 82, IPSJ SIG Notes, 99-AVM-26, p. 45-50.
Gertjan Keesman et al., "Transcoding of MPEG bitstreams," Signal Processing: Image Communication, Sep. 1996, vol. 8, Issue 6, p. 481-500.

(Continued)

*Primary Examiner*—Andy S Rao
(74) *Attorney, Agent, or Firm*—Sughrue Mion, PLLC

(57) ABSTRACT

A picture encoding system conversion device and a code rate conversion device for realizing the conversion taking into account both time delay and picture quality using the information on the code volume of the encoding parameters, input and output buffers and an input bitstream. There are provided a decoder 1 including an input buffer 21, a VLD unit 22, an inverse quantizer 23, an IDCT unit 24, an adder 35, a frame memory 26 and a motion compensation prediction unit 27; an encoder 2 including an adder 31, a DCT unit 32, a quantizer 33, an inverse quantizer 34, an IDCT unit 35, an adder 36, a frame memory unit 37, a motion compensation prediction unit 38, a VLD unit 39 and an output buffer 40; and a transcoder controller 3 including a decoder monitor unit 51, an input buffer monitor unit 52, a reception transmission channel monitor 53, a sending transmission channel monitor 63, an output buffer monitor unit 62 and a quantization step controller 74. The quantization step controller 74 modifies the quantization step of the encoder based on the information from the input buffer monitor, output buffer monitor, decoder monitor, reception transmission channel monitor and sending transmission channel monitor.

6 Claims, 10 Drawing Sheets

FOREIGN PATENT DOCUMENTS

| | | |
|---|---|---|
| JP | H9-298749 A | 11/1997 |
| JP | 10-32830 | 2/1998 |
| JP | 10-336672 | 12/1998 |
| JP | H11-252546 A | 9/1999 |
| JP | 11-285002 | 10/1999 |

OTHER PUBLICATIONS

Satoshi Nishimura et al., "Development of real time MPEG-2 video transcoder software," Joho Shori Gakkai Kenkyu Hokoku, Jun. 4, 1999, vol. 99, No. 52, IPSJ S0IG Notes, 99-AVM-25, p. 25 through 30.

\* cited by examiner

PICTURE ENCODING SYSTEM CONVERSION DEVICE AND ENCODING RATE CONVERSION DEVICE

This is a divisional of Application Ser. No. 09/725,689, filed Nov. 30, 2000 now U.S. Pat. No. 6,959,041, the entire disclosure of which is considered part of the accompanying divisional application and is hereby incorporated by reference.

FIELD OF THE INVENTION

This invention relates to a picture (or image) encoding system conversion device and encoding rate conversion device and, more particularly, to a device which performs rate control taking both the picture quality and time delay accompanying the conversion into account.

BACKGROUND OF THE INVENTION

In a digital picture (or image) communication system or a digital picture communication service, the technique of encoding the picture information to reduce the information volume to effect transmission and storage is used in transmitting and storing the picture information. As an encoding system for moving picture, internationally standardized by ITU-T (International Telecommunication Union), there are known an encoding system prescribed by H. 261 Recommendations providing for standardization of transmitted pictures of visual telephone and video conference and H. 263 Recommendations providing for standardization of pictures transmitted over a low bitrate network, such as PHS (Personal Handy-Phone System).

In the encoding system for moving pictures, internationally standardized by ISO (International Organization for Standardization), there is known MPEG (Motion Picture Experts Group) 1, as an encoding system for stored video images, while there are known MPEG-2 and MPEG4 as a universal encoding system and a low bit rate encoding system, respectively.

The respective encoding systems used for moving picture compression are merely analogous to one another to the extent that these systems use the DCT (Discrete Cosine Transform), motion compensation prediction and Huffman codes in common, which constitutes only a part. However, bitstreams obtained on actual encoding differ from one system to another.

So, if it is desired to interconnect a system employing a certain picture encoding system to another encoding system employing another encoding system, picture codes, once formed, need to be decoded into picture signals, which then need to be re-encoded as an input picture.

For example, if the H. 261 bitstream is to be converted into that of H. 263 or MPEG4, not having the in-loop filtering function, such as one provided in H. 261, it is necessary to decode the encoded bitstream into an input picture and to re-encode the resulting picture signals.

On the other hand, if it is desired to convert a bitstream of H. 263 or MPEG4 into that of H. 261, it is necessary to decode the bitstream into a picture and to re-encode the resulting picture. This is because the maximum value of the motion vector of H. 263 or MPEG4 is larger than that of the motion vector of H. 261, while the motion vector of H. 261 merely has the vector merely of an integer precision.

That is, for converting a picture encoding system into another appreciably different picture encoding system, it is necessary for transforming a bitstream to interconnect a decoder to an encoder, first to revert the input bitstream transiently into picture signals by a decoder, and then to re-encode the picture signals as an encoder input signal.

For moving picture data, encoded in accordance with a certain encoding system, there is known an encoding rate converting system, as a method for realizing rate conversion between an input bitstream and an output bitstream. This rate conversion is carried out when the bandwidth of a transmission channel for the input bitstream differs from that of transmission channel for an output bitstream.

FIG. 10 shows an embodiment of a structure of a conventional picture encoding system converting device. Referring to FIG. 10, this picture encoding system converting device includes a buffer for storing a bitstream output from outside, a decoder 6 for decoding picture codes output from the buffer 5, an encoder 7 for encoding picture signals output from the decoder 6 and another buffer 8 for storing picture codes output from the encoder 7 to output the picture codes to outside.

The encoder 7 monitors the storage volume (occupied volume) in the buffer 8. This stored volume in the buffer is utilized for controlling the volume of the generated codes during encoding by the encoder 7.

As this sort of the picture encoding system conversion device, there is proposed in e.g., JP Patent Kokai JP-A-7-107461 a picture encoding system conversion device adapted for storing the hysteresis information of encoding parameters, such as motion vector or quantization step size etc., used in decoding, and referencing these encoding parameters to determine the encoding parameters to effect re-encoding.

In e.g., JP Patent Kokai JP-A-7-288804, there is proposed, as a re-encoding device for picture signals in which it is possible to prevent picture quality deterioration resulting from re-encoding and to freely select the picture quality on re-encoding, a configuration in which the number of quantization bits is set in addition to the prediction mode, motion vector and the quantization step size, as encoding parameters obtained on decoding an input bitstream, to enable re-encoding with an optional data amount.

In e.g., JP Patent Kokai JP-A-8-111870, there are also proposed, as a method and apparatus for re-encoding the picture information in such a manner as to assure optimum picture quality even for a picture having encoding hysteresis, a method and apparatus in which re-encoding is achieved using the prediction mode, motion vector, quantization step size or periods or phase of picture types, as encoding parameters obtained on decoding the input bitstream.

In e.g., JP Patent Kokai JP-A-10-32830, there is proposed a device for re-encoding picture signals in which the quantization step size acquired on decoding an input bitstream is used to determine the quantization step size of an encoder to realize the re-encoding.

In e.g., JP Patent Kokai JP-A-10-336672, there is proposed, in an encoding system conversion device in which, in re-encoding encoded picture data in accordance with a different encoding system, the processing volume is diminished without deteriorating the motion vector detection accuracy, a configuration in which the motion vector obtained in decoding encoded picture data is stored and scaled depending on the conversion scale of the picture size, or is converted in quantity depending on the number of frames, the so scaled or converted motion vectors are provided as candidates and one of these candidates is used to effect re-encoding.

In e.g., JP Patent Kokai JP-A-11-285002, there is proposed a moving picture encoding device in which quantization control is performed on a bitstream obtained on encoding a moving picture so that the bitrate of a bitstream acquired on re-encoding will fall within a preset range.

As another example of the encoding rate conversion device, there is proposed in e.g., JP Patent Kokai JP-A-8-251587 a configuration of a rate conversion device for encoded picture data having a performance comparable to the transcoding using means simpler than the transcoding. In the above-described encoding rate converting device, disclosed in the JP Patent Kokai JP-A-8-251587, there is proposed a configuration in which inverse-quantized encoded data is re-quantized to control the rate control of the quantization level. However, this conventional encoded picture data rate conversion device, described in the JP Patent Kokai JP-A-8-251587, which decodes the received bitstream and uses the resulting encoding parameters to improve the picture quality on re-encoding, fails to take into account the delay time produced on effecting conversion of the encoding system.

SUMMARY OF THE DISCLOSURE

Meanwhile, if the conversion of the picture encoding system is to be performed off-line, time delay caused in the encoding system conversion is not so problematic.

However, in the picture encoding system conversion used in real-time communication, time delay caused in the encoding system conversion brings about a lowered service quality.

On the other hand, the conventional encoding rate conversion device, while stating the method for determining the quantization step, fails to take the time delay into account.

The above-described conventional devices suffer the following problems:

As a first problem, in the conventional picture encoding system conversion device stated in the above-described JP Patents Kokai JP-A-7-107461, 7-288804, 8-111870, 10-336672 and 10-32830, in which an input bitstream is decoded and the resulting encoding parameters are used for encoding to convert the encoding system, fails to take the time delay caused in converting the encoding system into account, thus occasionally causing marked transmission delay or lowering the encoding efficiency.

That is, buffer delay caused in an output buffer owned by the picture encoding system conversion device is not considered so that the problem of overflow or underflow in the output buffer or the rate of the output bitstream is not taken into consideration, thus occasionally leading to a drastic transmission delay or a significantly lowered encoding efficiency.

As a second problem, the picture encoding system conversion device, described in the above-described JP Patent Kokai JP-A-11-285002, showing means for limiting the range of the bitrates of the output bitstream to within a preset range, fails to take the realtime conversion of the encoding system into consideration.

That is, although the bitrate of the output bitstream is taken into consideration, no consideration is given to the delay etc. produced in the output buffer.

As a third problem, although the conventional picture encoding system conversion device re-utilizes the encoding parameters produced on decoding the input bitstream, use of the information on the encoding quantity that can be grasped from the input bitstream is not taken into account. In short, when the input bitstream is decoded, the encoding volume of each frame, each GOB (group-of-pictures) and each macroblock can be grasped, however, such encoding volume cannot be utilized effectively.

With a simple encoder, it is possible to calculate an optimum volume of bit allocation to each frame from the band of the transmission channel for transmitting the bitstream and from the picture sampling interval.

However, in the case of the picture encoding system conversion device, the picture fed to the encoder is a picture acquired on decoding the input bitstream, and is a picture having a diminished information volume. So, the picture quality cannot be expected to be improved appreciably even if the code volume to be allocated is increased, thus leading to an increased delay time.

Conversely, if the code volume to be allocated is decreased, there may be an occurrence that the band of the transmission channel cannot be utilized effectively.

So, it is necessary to make re-encoding using the information on the code volume as grasped from the input bitstream to take the picture quality, delay time and the band of the transmission channel into consideration to effect rate control.

It is therefore an object according to an aspect of the present invention to provide a picture encoding system conversion device and an encoding rate conversion device in which delay time increase or picture quality deterioration may be decreased.

It is another object according to another aspect of the present invention to provide a novel picture encoding system conversion device and an encoding rate conversion device, which can make best use of the information on the code volume such as that of encoding parameters, input buffer, output buffer, input bitstream or the output bitstream, and in which picture encoding system conversion and code rate conversion can be realized taking realtime conversion into consideration.

Further aspects and objects of the present invention will become apparent in the entire disclosure.

According to a first aspect of the present invention, there is provided a picture encoding system conversion device including a decoder receiving picture codes, compressed in information volume, from a reception side transmission channel via an input buffer and expanding the received picture codes to output expanded picture codes, an encoder compressing the picture codes, decoded by the decoder, in information volume, to generate picture codes to output generated picture codes from an output buffer to a sending side transmission channel, and a transcoder controller controlling the encoder. The transcoder controller includes an input buffer monitor monitoring the input buffer of the decoder, an output buffer monitor monitoring the output buffer of the encoder and quantization step controller modifying (or changing) a quantization step in the compression processing of the encoder based on the information from the input buffer monitor and the output buffer monitor.

In the picture encoding system conversion device according to the first aspect, the decoder includes a variable length decoder unit, and the transcoder controller further includes a decoder monitor monitoring the variable length decoder unit. The quantization step controller modifies the quantization step of the encoder based on the information from the input buffer monitor, the output buffer monitor and the decoder monitor.

In the picture encoding system conversion device according to the first aspect, the transcoder controller includes a reception side transmission channel monitor monitoring the state of the receiving side transmission channel, and a sending side transmission channel monitor monitoring the state of the sending side transmission channel. The quantization step controller modifies the quantization step of the encoder based on the information from the input buffer monitor, output buffer monitor, reception side transmission channel monitor and the sending side transmission channel monitor.

In the picture encoding system conversion device, according to the present invention, the decoder includes a variable length decoding unit. The transcoder controller further includes a decoder monitor monitoring the variable length decoding unit, a reception side transmission channel monitor monitoring the state of the reception side transmission channel, and a sending side transmission channel monitor monitoring the state of the sending out side transmission channel. The quantization step controller modifies the quantization step of the encoder based on the information from the input buffer monitor, output buffer monitor, decoder monitor, reception side transmission channel monitor and the sending side transmission channel monitor.

In another aspect, the present invention provides a code rate conversion device including a code rate conversion unit receiving picture codes compressed in information volume from a reception side transmission channel by an input buffer, converting the code rate of the picture codes and subsequently sending out the resultant picture codes through an output buffer to a sending side transmission channel, and a transcoder controller controlling the code rate, wherein the transcoder controller includes an input buffer monitor monitoring the input buffer, an output buffer monitor monitoring the output buffer and a quantization step controller modifying the quantization step in the compression processing of the code rate conversion unit based on the information from the input buffer monitor and from the output buffer monitor.

In the code rate conversion device according to the present invention, the code rate conversion unit includes a variable length decoding unit. The transcoder controller includes a decoder monitor-monitoring the variable length decoding unit.

The quantization step controller modifies the quantization step of the code rate conversion unit based on the information from the input buffer monitor, output buffer monitor and the decoder monitor.

In the code rate conversion device according to the present invention, the code rate conversion unit further includes a reception side transmission channel monitor monitoring the state of the reception side transmission channel and a sending side transmission channel monitor monitoring the state of the sending out side transmission channel. The quantization step controller modifies the quantization stop of the code rate conversion unit based on the information from the input buffer monitor, output buffer monitor, reception side transmission channel monitor and the sending side transmission channel monitor.

In the code rate conversion device according to the present invention, the code rate conversion unit includes a variable length decoding unit, and the transcoder controller includes a decoder monitor monitoring the variable length decoding unit, a reception transmission channel monitor monitoring the state of the reception side transmission channel and sending out transmission channel monitor monitoring the state of the sending out transmission channel. The quantization step controller modifies the quantization step of the code rate conversion unit based on the information from the input buffer monitor, output buffer monitor, decoder monitor, reception side transmission channel monitor and the sending out side transmission channel monitor.

Further aspects and modes of the present invention will become apparent from the entire disclosure including the following description and the claims. The features of the appended claims are herein incorporated by reference thereto.

PREFERRED EMBODIMENTS OF THE INVENTION

Figure 1:
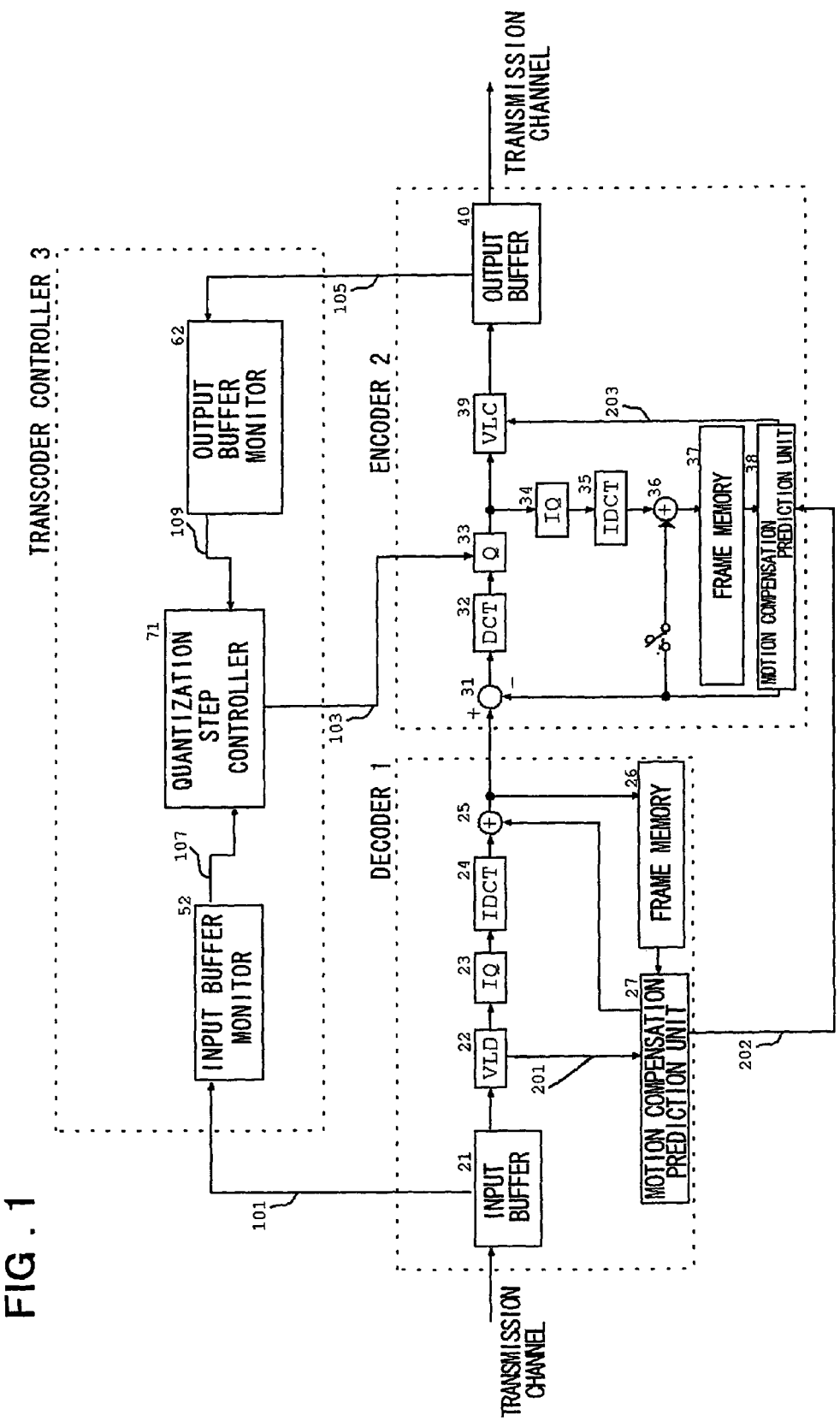
FIG. 1 shows the structure of a first embodiment of the present invention.

In the following, preferred embodiments of the present invention are explained. Referring to FIG. 1, a picture encoding system conversion device according to a first embodiment of the present invention includes a decoder 1 for receiving picture codes, compressed in information volume, from a reception side transmission channel via an input buffer 21 and for expanding the received picture codes to output expanded picture codes. An encoder 2 compresses the picture signals, decoded by said decoder, in information volume, to generate picture codes to output the generated picture codes from an output buffer 40 to a sending out side transmission channel. A transcoder controller 3 includes input buffer monitor 52 for monitoring said input buffer 21 of the decoder 1 and output buffer monitor 62 for monitoring the output buffer of the encoder 2. There is also provided a quantization step controller 71 for modifying the quantization step in the compression processing of the encoder 2 based on the information from said input buffer monitor 52 and the output buffer monitor 62.

Figure 2:
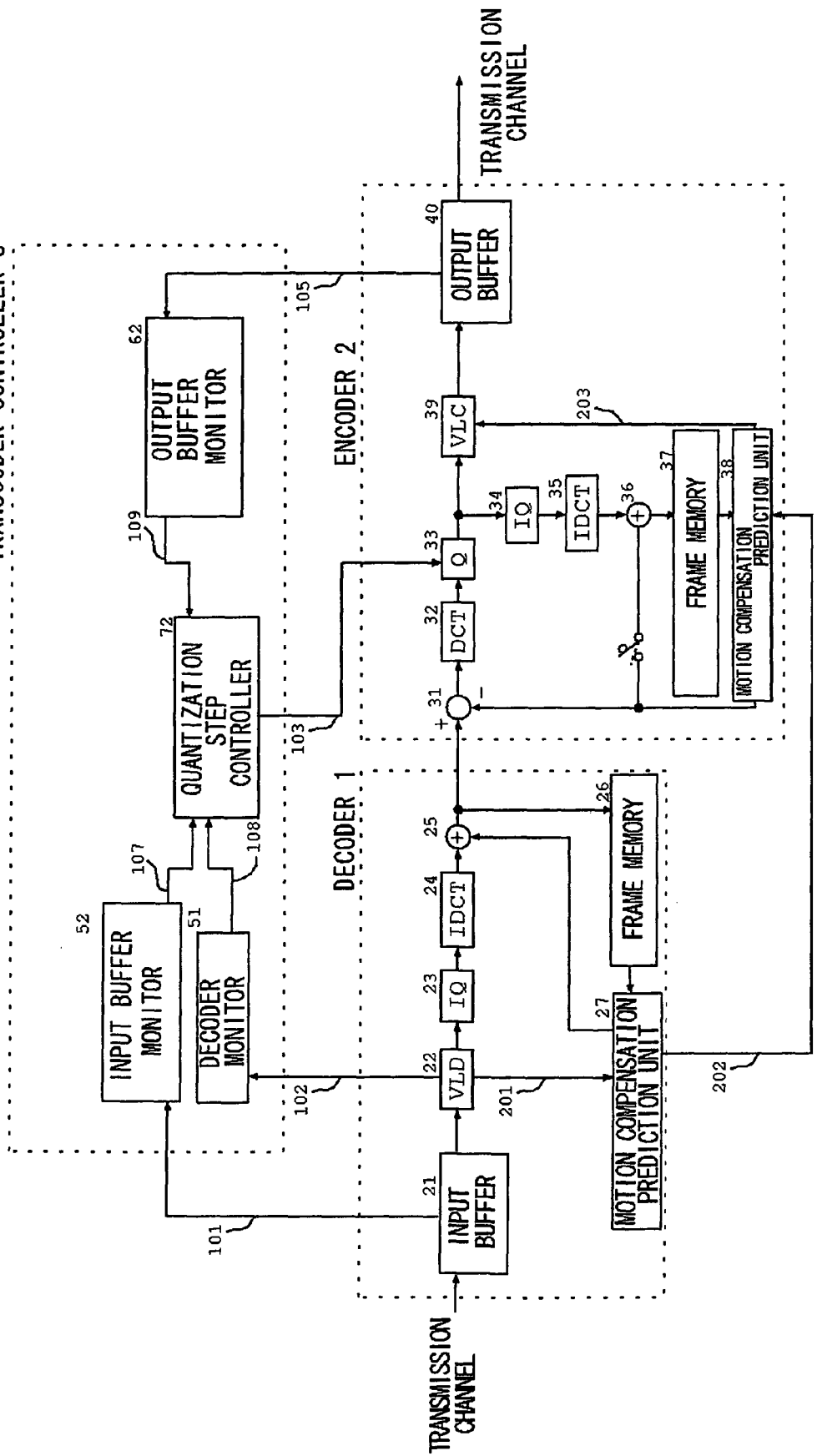
FIG. 2 shows the structure of a second embodiment of the present invention.

Referring to FIG. 2, a code rate conversion device of a second embodiment of the present invention includes a decoder 1 for receiving picture codes compressed in information volume from a reception side transmission channel by an input buffer 21 and for subsequently sending out the decoded picture codes through an output buffer 40 to a sending out side transmission channel. A transcoder controller 3 includes a decoder monitor 51 for monitoring the VLD unit 22 of the decoder 1, an input buffer monitor 52 for monitoring the input buffer 21 of the decoder 1, and an output buffer monitor 62 for monitoring the output buffer 40 of the encoder 3. There is also provided a quantization step controller 72 for modifying the quantization step in the compression processing of the code rate conversion unit based on the information from the input buffer monitor and from the output buffer monitor.

Figure 3:
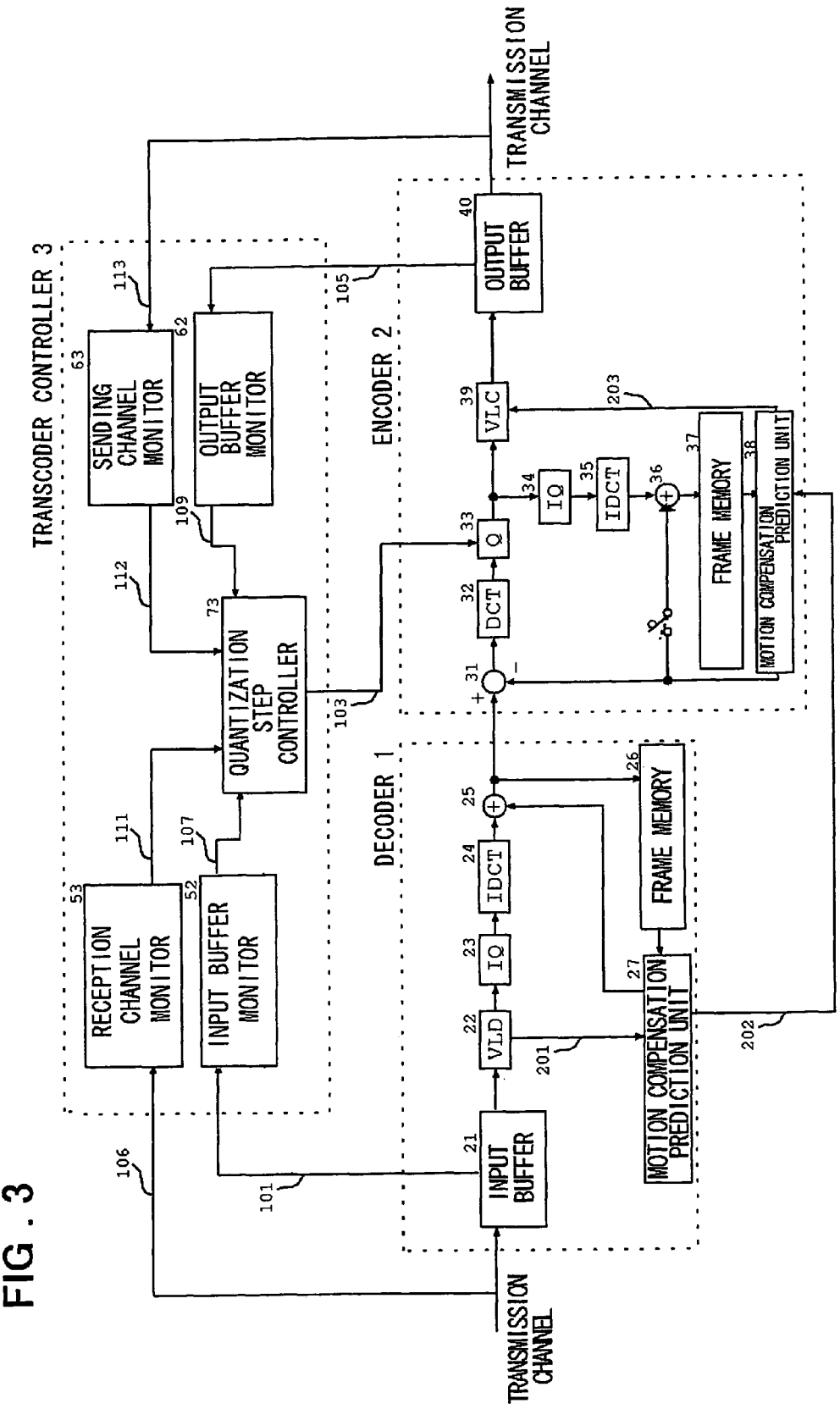
FIG. 3 shows the structure of a third embodiment of the present invention.

Referring to FIG. 3, an encoding system conversion device for converting a signal encoded in one encoding system into a signal of another encoding system, according to a third embodiment of the present invention, includes a decoder 1 for receiving a compression-coded signal in an input buffer 21 to decode the signal in a variable length decoder 22 to output picture signals. An encoder 2 is fed with a signal output from the decoder 1 to compress the information to output the information to a sending out transmission channel via an output buffer 40. A transcoder controller 3 has an input buffer monitor 52 for monitoring the input buffer 21 of the decoder 1, an output buffer monitor 62 for monitoring the output buffer 40 of the encoder 2, a reception transmission channel monitor 53 for monitoring the state of the reception transmission channel and a sending out transmission channel monitor 63 for monitoring the state of the sending out transmission channel. There is also provided a quantization step controller 73 for variably controlling the quantization step in the quantizer 33 of the encoder 2 based on the information from the input buffer monitor 52, output buffer monitor 62, reception transmission channel monitor 53 and the sending out transmission channel monitor 63.

Figure 4:
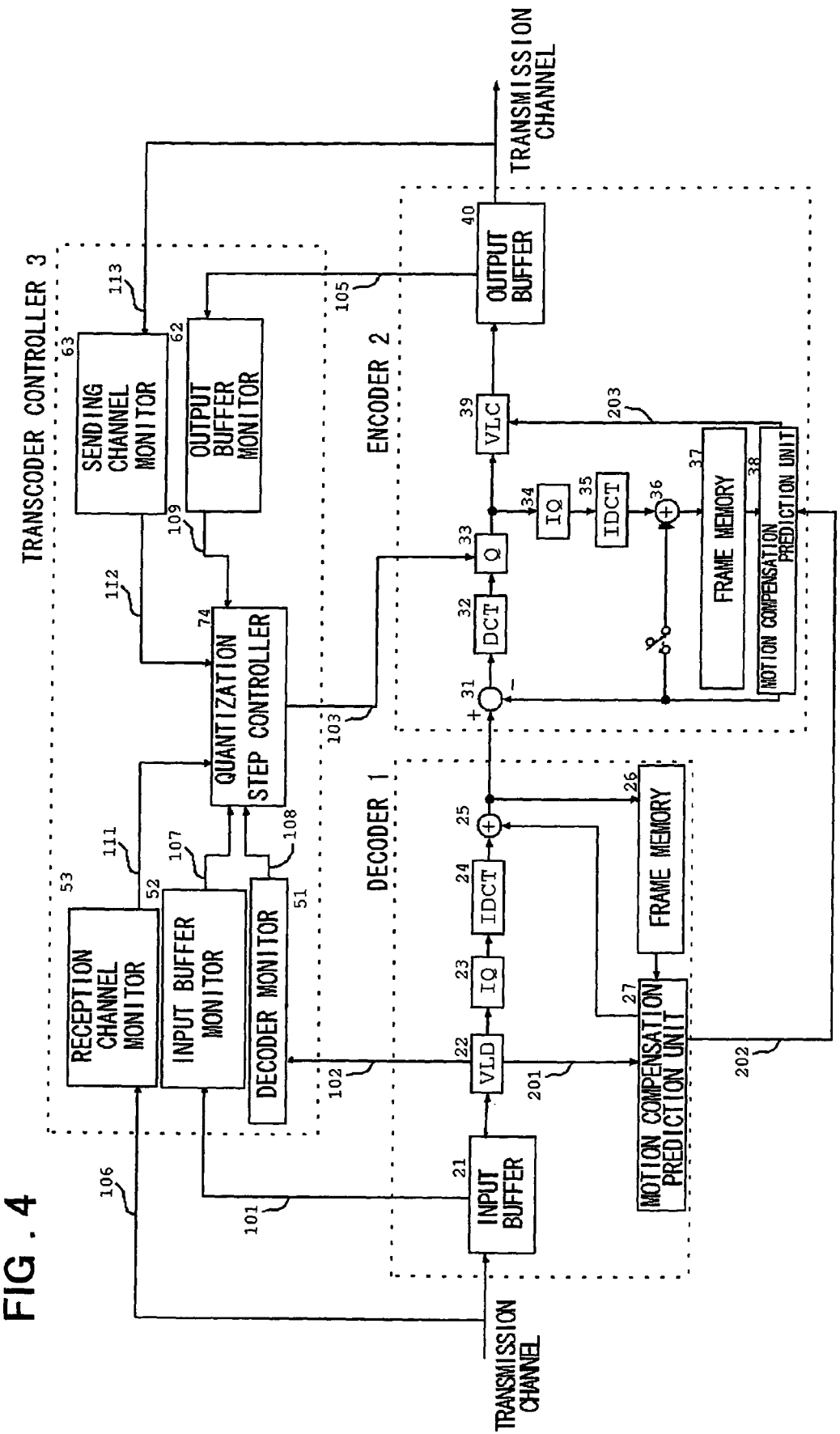
FIG. 4 shows the structure of a fourth embodiment of the present invention.

Referring to FIG. 4, an encoding system conversion device for converting a signal encoded in one encoding system into a signal of another encoding system, according to a fourth embodiment of the present invention, includes a decoder 1 fed with a compression-coded signal in an input buffer 21 to decode the signal in a variable length decoding unit 22 to output the resulting picture signals. An encoder 2 is fed with a signal output from the decoder 1 to compress the information to output the information to a sending out transmission channel via an output buffer 40. A transcoder controller 3 has a decoder monitor 51 for monitoring the VLD unit 22 of the decoder 1, an input buffer monitor 52 for monitoring the input buffer 21 of the decoder 1, an output buffer monitor 62 for monitoring the output buffer 40 of the encoder 2, a reception transmission channel monitor 53 for monitoring the state of the reception transmission channel and a sending out transmission channel monitor 63 for monitoring the state of the sending out transmission channel. There is also provided a quantization step controller 74 for variably controlling the quantization step in the quantizer 33 of the encoder 2 based on the information from the decoder monitor 51, input buffer monitor 52, output buffer monitor 62, reception transmission channel monitor 53 and the sending out transmission channel motor 63.

The decoder 1 includes an input buffer 21 fed with a signal from the reception side transmission channel, a VLD unit 22 for decoding the encoded data from the input buffer 21, a first inverse quantizer (IQ) 23 for inverse quantizing the quantized transform coefficients from the VLD unit 22, an IDCT unit 24 fed with an output of the first inverse quantizer 23, a first adder 25 fed at its one input with an output of the IDCT unit 24 and a first motion compensation prediction unit 27 fed with the encoding parameters from the VLD unit 22 and with the output of the VLD unit 22. The encoder 2 includes a second adder 31 fed with an output of the first adder 25, a DCT unit 32 for transforming an output of the second adder 31, a quantizer (Q) 33 for quantizing an output of the DCT unit 32, a VLC 39 for encoding an output of the quantizer 33, an output buffer 40 fed with an output of the quantizer 33 to output to the sending out transmission channel, an inverse quantizer 34 for inverse quantizing an output of the quantizer 33, an IDCT unit 35 for transforming an output of the inverse quantizer 34, a third adder 36 fed with an output of the IDCT unit 35, a second frame memory unit 37 fed with an output of the third adder 36 and a second motion compensation prediction unit 38 fed with picture signals from the second frame memory unit 37 and with encoding parameters from the first motion compensation prediction unit 27. An output 203 from the second motion compensation prediction unit 38 is fed to the VLC 39 and to the second adder 31, while being sent via a switch 41 to the third adder 36. The switch 41 is off and on for the I-Picture (intra-coded picture) and for the P-picture (predictive picture) and for the b-picture (bidirectional predictive picture), respectively. The second adder 31 subtracts 0 from an output of the first adder 25 if the picture is an I-picture, while outputting a difference between the output the first adder 25 and the output of the second motion compensation prediction unit 38 if the picture is a P- or B-picture.

Figure 5:
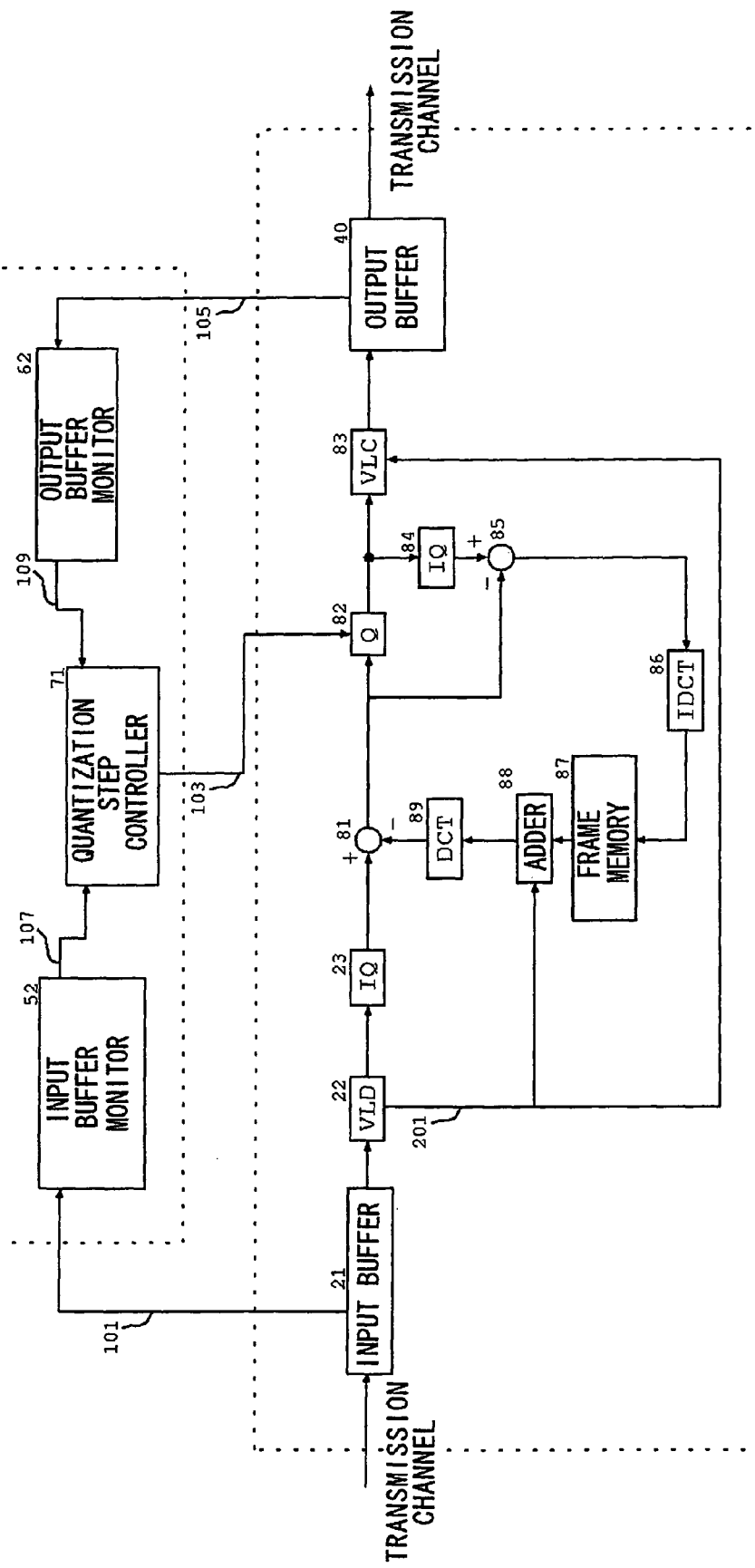
FIG. 5 shows the structure of a fifth embodiment of the present invention.

Referring to FIG. 5, a code rate conversion device for converting a signal encoded in one encoding system into a signal of another encoding system according to a fifth embodiment of the present invention includes a code rate conversion unit 4 including an input buffer 21 fed from a reception side transmission channel with a signal compressed in information volume, and configured for sending out the picture codes compressed in information volume from an output buffer 40 to a sending out side transmission channel, and a transcoder controller 3 including an input buffer monitor 52 for monitoring the input buffer 21, an output buffer monitor 62 for monitoring the output buffer 40, and a quantization step controller 71 for variably controlling the quantization step in the quantizer (Q) 82 of the code rate conversion device 4 based on the information from the input buffer monitor 52 and the output buffer monitor 62.

Figure 6:
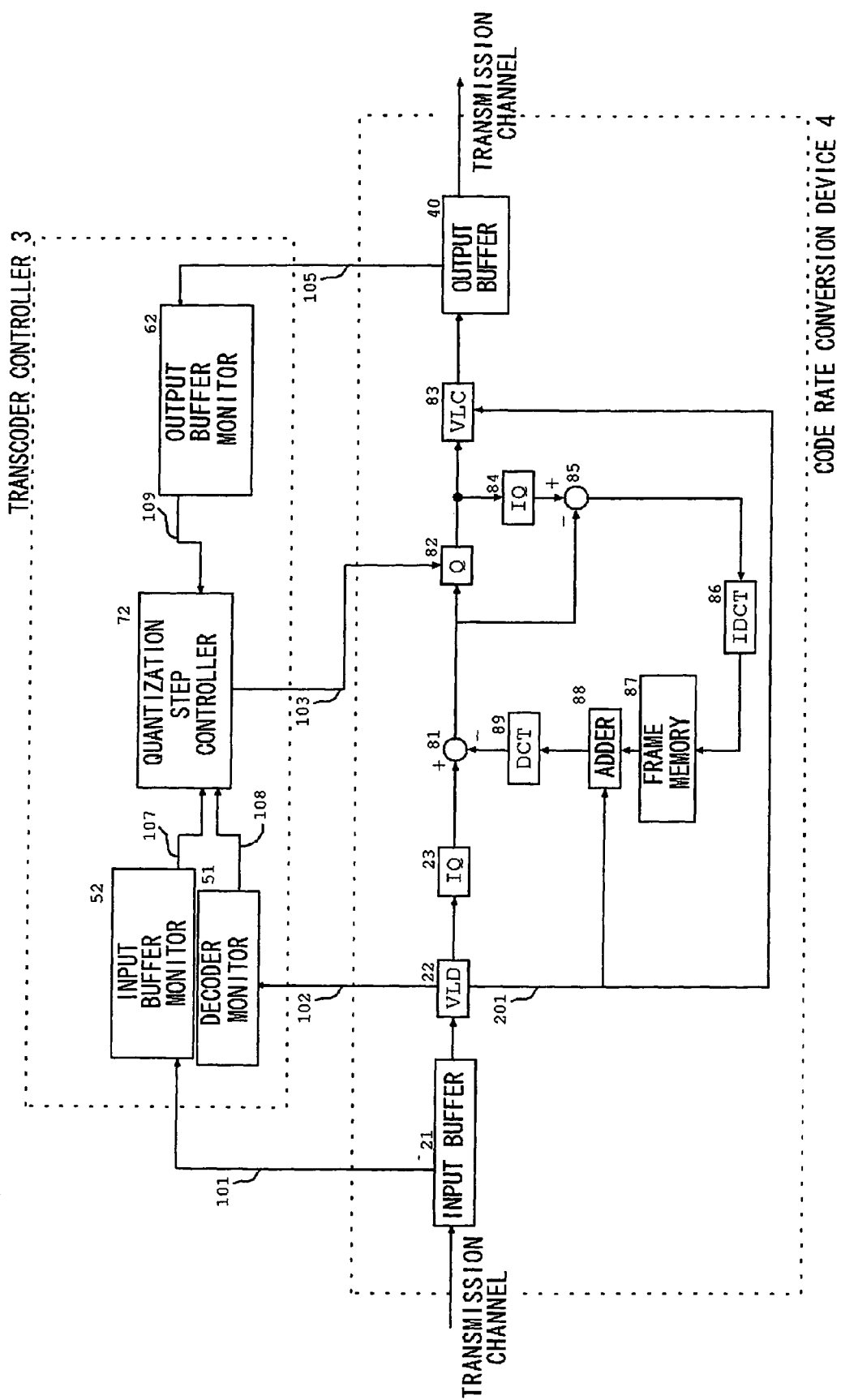
FIG. 6 shows the structure of a sixth embodiment of the present invention.

Referring to FIG. 6, a code rate conversion device for converting a signal encoded in one encoding system into a signal of another encoding system according to a sixth embodiment of the present invention includes, in addition to the structure shown in the above-described fifth embodiment, a decoder monitor 51 owned by the transcoder controller 3 for monitoring the VLD unit 22 of the code rate conversion device 4. The quantization step controller 72 variably controls the quantization step of the code rate conversion device 4 based on the information from the input buffer monitor 52, output buffer monitor 62 and the decoder monitor 51.

Figure 7:
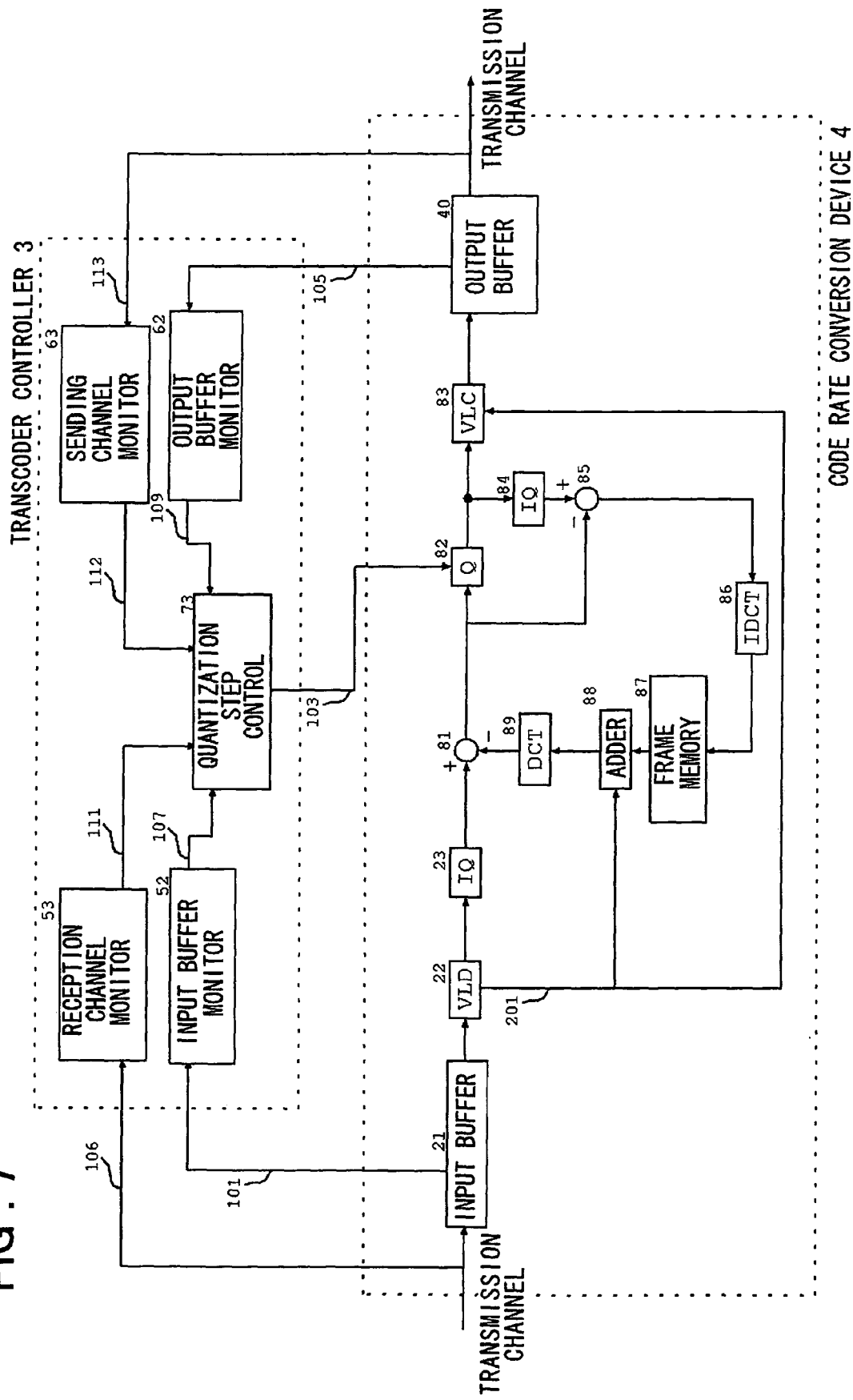
FIG. 7 shows the structure of a seventh embodiment of the present invention.

Referring to FIG. 7, a code rate conversion device for converting a signal encoded in one encoding system into a signal of another encoding system according to a seventh embodiment of the present invention includes, in addition to the structure shown in the above-described fifth embodiment, a reception transmission channel monitor 53 for monitoring the state of the reception side transmission channel and a sending out transmission channel monitor 63 for monitoring owned by the transcoder controller 3 for monitoring the state of the sending out side transmission channel, with both monitors being owned by the transcoder controller 3. The quantization step controller 72 variably controls the quantization step of the code rate conversion device 4 based on the information from the input buffer monitor 52, output buffer monitor 62 and the decoder monitor 51.

Figure 8:
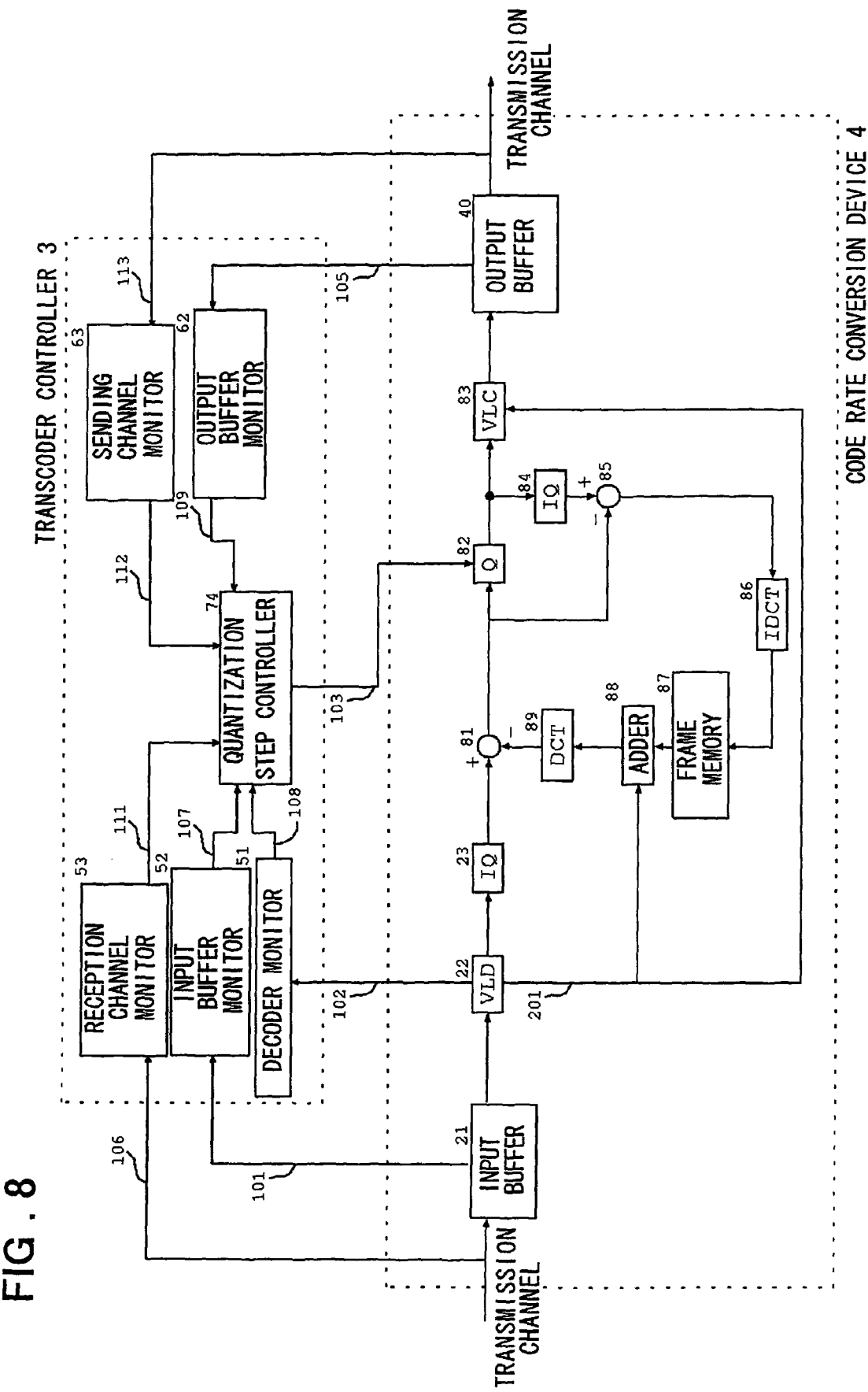
FIG. 8 shows the structure of an eighth embodiment of the present invention.

Referring to FIG. 8, a code rate conversion device for converting a signal encoded in one encoding system into a signal of another encoding system according to an eighth th embodiment of the present invention includes, in addition to the structure shown in the above-described fifth embodiment, a decoder monitor 51 owned by the transcoder controller 3 for monitoring the VLD unit, a reception transmission channel monitor 53 for monitoring the state of the reception side transmission channel and a sending out transmission channel monitor 63 for monitoring the state of the sending out side transmission channel, with both monitors being owned by the transcoder controller 3. The quantization step controller 74 variably controls the quantization step (Q) of the code rate conversion device 4 based on the information from the input buffer monitor 52, output buffer monitor 62, decoder monitor 51, reception transmission channel monitor 53 and the sending out transmission channel monitor 63.

In an preferred embodiment of the present invention, a picture code rate conversion device includes a code rate conversion unit 4. The code rate conversion unit 4 includes an input buffer unit 21 for being fed with a signal from a reception side transmission channel, a variable length decoding unit (VLD) 22 for decoding picture codes of said input buffer unit 21, a first inverse quantizer (IQ) 23 for quantizing an output of the first variable length decoder 22, a first adder 81 on one input end of which an output of the first inverse quantizer 23 is fed, a quantizer (Q) 82 for quantizing an output of the first a adder 81, a variable length encoder (VLC) 83 for encoding an output of the quantizer 82 to output an encoded output, an output buffer 40 fed with an encoded signal output of the variable length encoder 83 to output a resulting output to a sending out side transmission channel, a second inverse quantizer (IQ) 84 for inverse quantizing an output of the quantizer (Q), a second adder 85 for subtracting an output of the first adder 81 from an output of the second inverse quantizer 84, an IDCT unit 86 fed with an output of the second adder 85 as an input, a frame memory unit 87 fed with and storing an output of the IDCT unit 86, a difference calculating unit 88 for taking a difference between the current picture output from said variable decoding unit 87 and a picture one frame before from the frame memory unit 87 and a DCT unit 89 fed with an output of the difference calculating unit 88 as an input. The first adder 81 outputs a value corresponding to the output of the first inverse quantizer (IQ) 23 minus the output of the DCT unit 89. The encoding parameters output from the VLD unit 22 are input to the VLC 83. The quantization step controller 74 of the transcoder controller 3 variably controls the quantization step of the quantizer (Q) 82.

DETAILED DESCRIPTION OF THE PREFERRED EMBODIMENTS

In the following, certain preferred embodiments of the present invention are explained. FIG. 1 shows the structure of a first embodiment of the present invention. Referring to FIG. 1, the first embodiment of the present invention includes a decoder 1, an encoder 2 and a transcoder controller 3. The decoder 1 includes an input buffer 21, a variable length decoder (VLD) 22, an inverse quantizer (IQ) 23, an inverse discrete cosine transform (IDCT) unit 24, an adder 25, a frame memory 26 and a motion compensation prediction unit 27.

The encoder 2 includes an adder 31, a DCT (discrete cosine transform) unit 32, a quantizer (Q) 33, an inverse quantizer (IQ) unit 34, an inverse discrete cosine transform (IDCT) unit 35, an adder 36, a frame memory unit 37, a motion compensation prediction unit 38, a variable length encoder (VLC) 39, and an output buffer 40.

The transcoder controller 3 includes an input buffer monitor 52, an output buffer monitor 62, and a quantization step controller 71.

The decoder 1 and the encoder 2 decodes and encodes, respectively, in accordance with pre-existing encoding systems, such as H. 261, H. 263, or MPEG1, 2 or 4.

Referring to FIG. 1, the operation of the first embodiment of the present invention is explained in detail. First, the operation of the decoder 1 is explained.

The input buffer 21 stores a bitstream fed from an external transmission channel to output a stored bitstream to the VLD 22, while outputting the information 101 stored in the input buffer to the input buffer monitor 52.

The VLD unit 22 entropy-decodes the output bitstream from the input buffer 21, such as by variable length decoding or run-length decoding, to output the decoded quantized transform coefficients to the IQ unit 23. On the other hand, the VLD 22 outputs encoding parameters 201, such as motion vector or the prediction mode, to the motion compensation prediction unit 27.

The IQ unit 23 inverse-quantizes quantized transform coefficients, output from the VLD unit 22, to output the inverse-quantized transform coefficients to the IDCT unit 24.

The IDCT unit 24 performs matrix calculations of inverse discrete transform on the transform coefficients output from the IQ unit 23 to output the transformed picture signals to the adder 25.

The adder 25 sums a signal from the IDCT unit 24 and a picture signal output from the motion compensation prediction unit 27 as later explained to output a sum signal to the frame memory 26 and to an adder 31 of the encoder 2.

The frame memory 26 saves the picture signals output from the adder 25.

The motion compensation prediction unit 27 performs motion compensation prediction, using the encoding parameters 201 output from the VLD unit 22 and the picture signals stored in the frame memory 26, to output the resulting picture signals to the adder 25.

On the other hand, encoding parameters 202 are output to the motion compensation prediction unit 38 of the encoder 2.

The operation of the encoder 2 is now explained.

If the picture is a P- or B-picture, the adder 31 outputs picture signals corresponding to the sum of the picture signals output from the adder 25 and a prediction signal output from the motion compensation prediction unit 38, whereas, if the picture is an I-picture, the adder 31 directly outputs picture signals output from the adder 25.

The DCT unit 32 executes DCT matrix calculations (processing) on input picture signals to output the transform coefficients to the quantizer (Q) 33.

The quantizer 33 performs quantization calculations on transform coefficients output from the DCT unit 32 to output the resulting quantized transform coefficients to the VLC unit 39 and to the inverse quantizer 34.

It is noted that quantization characteristics are determined by the quantization step information 103 output from the quantization step controller 71.

The inverse-quantizer (IQ) 34 inverse-quantizes quantized transform coefficients output from the quantizer (Q) 33 to output the resulting transform coefficients to the IDCT unit 35.

The IDCT unit 35 performs IDCT matrix calculations on the transform coefficients output from the inverse-quantizer 34 to output picture signals corresponding to predicted error signals and those corresponding to the encoded picture signals to the adder 36 in case of the P- and B-pictures and in case of the I-picture, respectively.

The adder 36 outputs a signal corresponding to a sum of the picture signals output from the IDCT unit 35 and the predicted error signals in case of P- and B-pictures, whereas outputting the picture signals unchanged to the frame memory unit 37 in case of I-picture.

The frame memory unit 37 stores the picture signals output from the adder 36.

Using the encoding parameters 202 output from the motion compensation prediction unit 27 and the picture signals saved in the frame memory 37, the motion compensation prediction unit 38 performs motion detection and motion compensation prediction to generate motion compensated prediction picture signals which are output to the adders 31 and 36. The encoding parameters 203 are also output to the VLC unit 39.

The VLC unit 39 applies entropy encoding, such as VLC or run-length coding, to the quantized transform coefficients output from the quantizer 33 and the encoding parameters 203 output from the motion compensation prediction unit 38 to output the resulting encoded signals to the output buffer 40.

The output buffer 40 stores the encoded signals output from the VLC unit 39 to send the encoded signals to outside the apparatus.

The operation of the transcoder controller 3 is now explained.

The input buffer monitor 52 monitors the storage volume in the input buffer 21 of the decoder 1 to output the input buffer information 107 to the quantization step controller 71.

The output buffer monitor 62 monitors the stored output buffer volume of the output buffer 40 in the encoder 2 to output the output buffer information 109 to the quantization step controller 71.

Based on the input buffer information 107 and on the output buffer information 109, the quantization step controller 71 of the transcoder controller 3 determines the quantization step information 103 which is delivered to the quantizer (Q) 33 of the encoder 2.

The quantization step controller 71 continually monitors the output buffer information 109 and, should there be produced overflow in the output buffer 40, the quantization step information 103 is modified to diminish the code volume produced in the encoder 2 to prevent overflow from occurring in the output buffer 40.

Should there be produced or expected underflow in the output buffer 40, the quantization step information 103 is modified to increase the volume of codes produced in the encoder 2 to prevent the underflow in the output buffer 40. This evades the output buffer 40 from being destroyed or running into failure or.

It is also possible for the quantization step controller 71 to set the target storage volume in the output buffer 40 to determine the quantization step information 103 based on the relative magnitude of the output buffer information 109 as the actual storage volume and the target storage volume.

If the actual storage volume is larger than the target storage volume, the quantization step information 103 is modified to decrease the volume of the codes generated in the encoder 2, that is for increasing the quantization step.

If, conversely, the storage volume is smaller than the target storage volume, the quantization step information 103 is modified to increase the code volume generated in the encoder 2, that is to decrease the quantization step.

The target value can be variably set instead of being a fixed value. It is also possible to set the upper and lower limit target values and to set the target value within a certain preset range.

The quantization step controller 71 is able to calculate the code volume per processing unit from the input buffer information 107 and the output buffer information 109 in effecting picture coding system conversion.

Now considering the processing unit based pre- and post-conversion code volumes in case of performing the picture encoding system conversion, if the pre-conversion code volume is larger than the post-conversion code volume, the band of the transmission channel transmitting the bitstream would be not fully utilized. If, conversely, the post-conversion code volume is larger than the pre-conversion code volume, the bitstream cannot be sent with the band of the transmission channel sending out the bitstream, thus causing delay at the output buffer.

That is, if the pre-conversion code volume is coincident with the post-conversion code volume, the most effective utilization of the band of the transmission channel and the time delay are reduced, provided, however, that this is applicable to a case where the band of the transmission channel for the input bitstream is the same as that of the transmission channel for the output bitstream.

If both the bands are different, the post-conversion code volume is preferably coincident with a pre-conversion code volume multiplied with a ratio R which is a ratio between the input transmission channel band and the output transmission channel band, e.g., a ratio R of the input band to the output band.

Thus, with the quantization step controller 71, effective utilization of the transmission channel and reduction in the time delay may be realized by determining the quantization step depending on the difference between the processing unit based pre-conversion code volume and the post-conversion code volume in converting the picture encoding system.

If, for example, the pre-conversion code volume is larger than the post-conversion code volume, the quantization step information 103 is modified (or modulated) to increase the code volume generated in the encoder 2 at the next processing.

If, conversely, the pre-conversion code volume is less than the post-conversion code volume, the quantization step information 103 is modified (or modulated) to decrease the code volume generated in the encoder 2 at the next processing.

In this manner, it becomes possible to determine the processing unit based quantization step in converting the picture encoding system.

As a method for converting the picture encoding system, it is possible to use any of the quantization step modifying systems, such H. 261, H. 261, or MPEG 1, 2 or 4, which belong to the conventional picture encoding systems.

A second embodiment of the present invention is hereinafter explained. FIG. 2 shows the structure of the second embodiment. Referring to FIG. 2, the second embodiment of the present invention includes, in addition to the components of the first embodiment, a decoder monitor 51, owned by the transcoder controller 3, for monitoring the VLC unit 22. A quantization step controller 72 determines the quantization step information using the input buffer monitor 52, output buffer monitor 62 and the decoder monitor 51.

That is, referring to FIG. 2, the present second embodiment includes a decoder 1, an encoder 2 and a transcoder controller 3. The decoder 1 is made up of an input buffer 21, a VLD unit 22, an inverse-quantizer 23, an IDCT unit 24, an adder 25, a frame memory 26 and a motion compensation prediction unit 27. The encoder 2 is made up of an adder 31, a DCT unit 32, a quantizer 33, an inverse-quantizer 34, an IDCT unit 35, an adder 36, a frame memory unit 37, a motion compensation prediction unit 38, a VLC unit 39 and an output buffer 40. The a transcoder controller 3 is made up of an input buffer monitor 52, an output buffer monitor 62 and a quantization step controller 72.

Referring to FIG. 2, the operation of the second embodiment of the present invention is explained in detail.

In addition to the operation of the above-described first embodiment, the operation of the decoding unit 1 includes the operation of the VLD unit 22 outputting encoding parameters 102 to the decoder monitor 51 of the transcoder controller 3. The operation of the encoder 2 is similar to that of the previous first embodiment.

The operation of the transcoder controller 3 is now explained.

The decoder monitor 51 monitors the VLD unit 22 of the decoder 1 and outputs encoding parameters 108 to the quantization step controller 72.

The input buffer monitor 52 monitors the stored input buffer volume in the input buffer 21 to output the input buffer information 107 to the quantization step controller 72.

The output buffer monitor 62 monitors the stored output buffer volume in the output buffer 40 of the encoder 2 to output the output buffer information 109 to the quantization step controller 72.

The transcoder controller 3 determines the quantization step information 103 based on the input buffer information 107 and the output buffer information 109 to deliver the so-determined information to the quantizer (Q) 33 of the encoder 2.

The transcoder controller 3 is also able to determine the quantization step information 103 by referencing also the encoding parameters 108.

The quantization step controller 72 monitors the output buffer information 109, such that, if overflow would be produced in the output buffer 40, the quantization step controller 72 causes the quantization step information 103 to decrease the code volume generated in the encoder 2 to prevent overflow from occurring in the output buffer 40.

If underflow would be produced in the output buffer 40, the quantization step information 103 is modified to increase the volume of codes generated in the encoder 2 to prevent underflow of the output buffer 40. This prevents the output buffer 40 from failure.

It is possible for the quantization step controller 72 to set the target storage volume in the output buffer 40 to determine the quantization step information 103 based on the relative magnitudes between the output buffer information 109 as the actual storage volume and the target storage volume.

If the actual storage volume would become or is larger than the target storage volume, the quantization step information 103 is modified to decrease the volume of the codes generated in the encoder 2, that is to increase (or enlarge) the quantization step.

If conversely, the actual storage volume is smaller than the target storage volume, the quantization step information 103 is modified to increase the volume of the codes generated in the encoder 2, that is to decrease (or shorten) the quantization step.

The target value can be variably set instead of being a fixed value. It is also possible to set the upper and lower limit target values and to set the target value within a certain preset range.

The quantization step controller 72 calculates the code volume per processing unit based on the input buffer information 107 and the output buffer information 109 in effecting picture coding system conversion.

Now considering the processing unit based pre- and post-conversion code volumes in case of performing the picture encoding system conversion, if the pre-conversion code volume is larger than the post-conversion code volume, the band of the transmission channel transmitting the bitstream is not fully utilized. If, conversely, the pre-conversion code volume is smaller than the post-conversion code volume, the bitstream cannot be sent with the band of the transmission channel sending out the bitstream, thus causing delay at the output buffer.

That is, if the pre-conversion code volume is coincident with the post-conversion code volume, the effective utilization of the band of the transmission channel is achieved, and time delay is reduced, provided, however, that this is applicable to a case where the band of the transmission channel for the input bitstream is the same as that of the transmission channel for the output bitstream.

That is, if the bands would differ, the post-conversion code volume is desirably coincident with the pre-conversion code volume multiplied with a ratio R which is a ratio between the input transmission channel band and the output transmission channel band.

In the transcoder controller 3, effective utilization of the transmission channel band and reduction in the delay time can be realized by determining the quantization step depending on the difference between the processing-unit-based pre-conversion code volume and the processing-unit-based post-conversion code volume as at the time of performing the picture encoding system conversion.

For example, if the pre-conversion code volume would become or is larger than the post-conversion code volume, the quantization step information 103 is modified such as to increase the code volume generated in the encoder 2 at the time of the next processing. If, conversely, the pre-conversion code volume would become or is smaller than the post-conversion code volume, the quantization step information 103 is modified such as to decrease the code volume generated in the encoder 2 at the time of the next processing. This allows to determine the quantization step per processing unit in converting the picture encoding system.

In the second embodiment of the present invention, the quantization step information 103 is determined (additionally) using the encoding parameters 108 output from the decoder monitor at the time of determining the quantization step. The reason is that, taking the picture quality following the conversion of the picture encoding system into consideration, the pre-conversion code volume can be equated to the post-conversion code volume by performing the encoding using the quantization step obtained in the decoder 1 in performing the quantization in the encoder 2.

If a quantization step used in decoding significantly differs from a quantization step used in encoding, picture distortion tends to be produced.

The picture quality can be improved by determining the quantization step information 103 with the aid of the encoding parameters 108 output from the decoder monitor 51. Control may be managed by performing fine adjustment, depending on the output buffer 40, pre-conversion code volume and on the post-conversion code volume, using the quantization step output from the decoder monitor 51 as an initial value.

As the method for modifying the quantization step, use may be made of any of conventional picture encoding systems, such as the quantization step modifying systems, e.g., H. 261, H. 263, or MPEG1, 2 or 4.

A third embodiment of the present invention is now explained. FIG. 3 shows the configuration of the third embodiment of the present invention. Referring to FIG. 3, the third embodiment of the present invention includes, in addition to the components of the first embodiment, a reception side transmission channel monitor ("reception channel monitor") 53 for monitoring the reception side transmission channel and a sending out side transmission channel monitor 63 for monitoring the sending out side transmission channel, these monitors 53, 63 being provided in the transcoder controller 3. The quantization step controller 73 determines the quantization step information using the information output from the input buffer monitor 52, output buffer monitor 62, reception side transmission channel monitor 53 and from the sending out side transmission channel monitor 63.

That is, referring to FIG. 3, the present third embodiment includes decoder 1, encoder 2 and transcoder controller 3. The decoder 1 is made up of an input buffer 21, a VLD unit 22, an inverse-quantizer 23, an IDCT unit 24, an adder 25, a frame memory 26 and a motion compensation prediction unit 27. The encoder 2 is made up of an adder 31, a DCT unit 32, a quantizer 33, an inverse-quantizer 34, an IDCT unit 35, an adder 36, a frame memory unit 37, a motion compensation prediction unit 38, a VLC unit 39 and an output buffer 40. The transcoder controller 3 is made up of an input buffer monitor 52, a reception side transmission channel monitor 53, an output buffer monitor 62, a sending out side transmission channel monitor 63, and a quantization step controller 73.

Referring to FIG. 3, the operation of the third embodiment of the present invention is explained in detail.

The description for the operation of the decoder 1 and the encoder 2 is omitted because it is the same as that of the above-described first embodiment. The operation of the transcoder controller 3 is now explained.

The reception side transmission channel monitor 53 monitors the state of the transmission channel over which the input bitstream is transmitted to output the sending out side reception channel information 111 to the quantization step controller 73.

The sending out side transmission channel monitor 63 monitors the state of the transmission channel over which the output bitstream is transmitted to output the sending out side transmission channel information 112 to the quantization step controller 73.

The input buffer monitor 52 monitors the storage volume of the input buffer 21 of the decoder 1 to output the sending out side transmission channel information 112 to the quantization step controller 73.

The output buffer monitor 62 monitors the storage volume of the output buffer 40 of the encoder 2 to output the output buffer information 109 to the quantization step controller 73.

The transcoder controller 3 determines the quantization step information 103, based on the input buffer information 107 and the output buffer information 109, to deliver the resulting quantization step information 103 to the quantizer 33 of the encoder 2.

The reception side transmission channel information 111 and the sending out side transmission channel information 112 may also be referenced in determining the quantization step information 103.

The quantization step controller 73 monitors the output buffer information 109, such that, if overflow would occur in the output buffer 40, the quantization step information 103 is modified to reduce the volume of the codes generated in the encoder 2 to prevent overflow from occurring in the output buffer 40.

On the other hand, if underflow would occur in the output buffer 40, the quantization step information 103 is modified to increase the volume of the codes generated in the encoder 2 to prevent underflow from occurring in the output buffer 40.

This prevents the failure in operation from occurring in the output buffer 40.

It is also possible for the quantization step controller 73 to set the target storage volume in the output buffer 40 to determine the quantization step information 103 from the relative magnitude of the output buffer information 109 as the actual storage volume and the target storage volume.

If the actual storage volume is larger than the target storage volume, the quantization step information 103 is modified to decrease the volume of the codes generated in the encoder 2.

That is, adjustment is made for increasing the quantization step.

If, conversely, the storage volume is smaller than the target storage volume, the quantization step information 103 is modified to increase the code volume generated in the encoder 2.

That is, adjustment is made for decreasing the quantization step.

The target value can be variably set instead of being a fixed value.

It is also possible to set the upper and lower limit target values and to set the target value within a certain preset range.

The quantization step controller 73 calculates the code volume per processing unit (i.e., unit by unit) based on the input buffer information 107 and the output buffer information 109 in effecting picture coding system conversion.

Now, considering the processing-unit-based pre- and post-conversion code volumes in case of performing the picture encoding system conversion, if the pre-conversion code volume would become larger than the post-conversion code volume, the band of the transmission channel transmitting the bitstream is not fully unitized.

If, conversely, the pre-conversion code volume is smaller than the post-conversion code volume, the bitstream cannot be sent with the band of the transmission channel sending out the bitstream, thus causing delay at the output buffer.

That is, if the pre-conversion code volume is coincident with the post-conversion code volume, the most effective utilization of the band of the transmission channel and reduced time delay can be achieved.

The premise for this is that this is that the band of the transmission channel for the input bitstream is controlled to be the same as that of the transmission channel for the output bitstream.

That is, if the both bands would differ, the post-conversion code volume is desirably coincident with the pre-conversion code volume multiplied with a ratio R between the input transmission channel band and the output transmission channel band.

The ratio R between the input transmission channel band and the output transmission channel band can be calculated from the reception side transmission channel information 111 and the sending out side transmission channel information 112.

If both the input transmission channel and the output transmission channel are at the CBR (constant bit rate), that is the fixed transmission rate, the ratio R is constant, whereas, if one of them is at VBR (variable bit rate), that is at a variable transmission rate, the ratio R is variable.

So, in the quantization step controller 73, effective utilization of the transmission channel band and reduction in the delay time can be realized by determining the quantization step depending on the difference between the processing-unit-based pre-conversion code volume and the processing-unit-based post-conversion code volume as at the time of performing the picture encoding system conversion.

For example, if the pre-conversion code volume is larger than the post-conversion code volume, the quantization step information 103 is modified such as to increase the code volume generated in the encoder 2 at the time of the next processing.

If, conversely, the pre-conversion code volume is smaller than the post-conversion code volume, the quantization step information 103 is modified such as to decrease the code volume generated in the encoder 2 at the time of the next processing.

This allows to determine the quantization step per processing unit in converting the picture encoding system.

If the transmission channel is at the VBR, and there is certain allowance in the band of the transmission channel, the volume of the codes generated in the encoder 2 may be increased to achieve the effective band utilization.

If, conversely, there is no allowance in the band of the transmission channel, the quantization step information 103 is determined such as to decrease the volume of the codes generated in the encoder 3.

As the method for modifying the quantization step, use may be made of any of the conventional picture encoding systems, such as the quantization step modifying systems, e.g., H. 261, H. 261, or MPEG1, 2 or 4.

A fourth embodiment of the present invention is now explained. FIG. 4 shows the configuration of the fourth embodiment of the present invention. Referring to FIG. 4, the fourth embodiment of the present invention includes, in addition to the components of the first embodiment, a decoder monitor 51 for monitoring the reception side transmission channel, a reception side transmission channel monitor 53 for monitoring the reception side transmission channel and a sending out side transmission channel monitor 63 for monitoring the sending out side transmission channel, these monitors 51, 53 and 63 belonging to the transcoder controller 3. A quantization step controller 73 determines the quantization step information using the information output by the input buffer monitor 52, output buffer monitor 62, decoder monitor 51, reception side transmission channel monitor 53 and the sending out side transmission channel monitor 63.

That is, referring to FIG. 4, the present third embodiment includes decoder 1, encoder 2 and transcoder 3. The decoder 1 is made up of an input buffer 21, a VLD unit 22, an inverse-quantizer 23, an IDCT unit 24, an adder 25, a frame memory 26 and a motion compensation prediction unit 27. The encoder 2 is made up of an adder 31, a DCT unit 32, a quantizer 33, an inverse-quantizer 34, an IDCT unit 35, an adder 36, a frame memory unit 37, a motion compensation prediction unit 38, a VLC unit 39 and an output buffer 40. The transcoder controller 3 is made up of a decoder monitor 51, an input buffer monitor 52, a reception side transmission channel monitor 53, a sending out side transmission channel monitor 63, an output buffer monitor 62 and a quantization step controller 74.

Since the operation of the decoder 1 is the same as that of the second embodiment, while the operation of the encoder 2 is the same as that of the first embodiment, the corresponding explanation is omitted for simplicity.

The operation of the transcoder controller 3 is now explained.

The reception side transmission channel monitor 53 monitors the state of the transmission channel over which the input bitstream is transmitted to output the reception side transmission channel information 111 to the quantization step controller 74.

The sending out side transmission channel monitor 63 monitors the state of the transmission channel over which the output bitstream is transmitted to output the sending out side transmission channel information 112 to the quantization step controller 74.

The decoder monitor 51 monitors the VLD unit 22 of the decoder 1 to output the encoding parameters 108 to the quantization step controller 72.

The input buffer monitor 52 monitors the storage volume of the input buffer 21 of the decoder 1 to output the input buffer information 107 to the quantization step controller 74.

The output buffer monitor 62 monitors the storage volume of the output buffer 40 of the encoder 2 to output the output buffer information 109 to the quantization step controller 74.

The transcoder controller 3 determines the quantization step information 103, primarily based on the input buffer information 107 and the output buffer information 109, to deliver the resulting quantization step information 103 to the quantizer (Q) 33 of the encoder 2.

The reception side transmission channel information 111 and the sending out side transmission channel information 112 may also be referenced in determining the quantization step information 103.

The quantization step controller 74 monitors the output buffer information 109, such that, if overflow occurs in the output buffer 40, the quantization step information 103 is modified to reduce the volume of the codes generated in the encoder 2 to prevent overflow from occurring in the output buffer 40.

On the other hand, if underflow occurs in the output buffer 40, the quantization step information 103 is modified to increase the volume of the codes generated in the encoder 2 to prevent underflow from occurring in the output buffer 40.

This prevents the failure in operation from occurring in the output buffer 40.

It is also possible for the quantization step controller 74 to set the target storage volume in the output buffer 40 to determine the quantization step information 103 from the relative magnitude of the output buffer information 109 as the actual storage volume and the target storage volume.

If the actual storage volume is larger than the target storage volume, the quantization step information 103 is modified such as to decrease the volume of the codes generated in the encoder 2.

If, conversely, the storage volume is smaller than the target storage volume, the quantization step information 103 is modified such as to increase the code volume generated in the encoder 2.

The target value can be variably set instead of being a fixed value.

It is also possible to set the upper and lower limit target values and to set the target value within a certain preset range.

The quantization step controller 74 is able to calculate the code volume per processing unit based on the input buffer information 107 and the output buffer information 109 in effecting picture coding system conversion.

Now let's consider the processing-unit-based pre- and post-conversion code volumes in case of performing the picture encoding system conversion. If the pre-conversion code volume would become larger than the post-conversion code volume, the band of the transmission channel transmitting the bitstream would be not fully utilized.

If, conversely, the pre-conversion code volume is smaller than the post-conversion code volume, the bitstream cannot be sent with the band of the transmission channel sending out the bitstream, thus causing delay at the output buffer.

That is, if the pre-conversion code volume is coincident with the post-conversion code volume, the most effective utilization of the band of the transmission channel and reduced time delay can be achieved.

The premise for this is that this is that the band of the transmission channel for the input bitstream is the same as that of the transmission channel for the output bitstream.

That is, if both the bands differ, the post-conversion code volume should be desirably coincident with the pre-conversion code volume multiplied with a ratio R between the input transmission channel band and the output transmission channel band.

The ratio R between the input transmission channel band and the output transmission channel band can be calculated from the reception side transmission channel information 111 and the sending out side transmission channel information 112.

If both the input transmission channel and the output transmission channel are at the CBR (constant bit rate), that is the fixed transmission rate, the ratio R is constant, whereas, if one of them is at VBR (variable bit rate), that is at a variable transmission rate, the ratio R is variable.

In the quantization step controller 74, effective utilization of the transmission channel band and reduction in the delay time can be realized by determining the quantization step depending on the difference between the processing-unit-based pre-conversion code volume and the processing-unit-based post-conversion code volume as at the time of performing the picture encoding system conversion.

For example, if the pre-conversion code volume is larger than the post-conversion code volume, the quantization step information 103 is modified such as to increase the code volume generated in the encoder 2 at the time of the next processing.

If, conversely, the pre-conversion code volume is smaller than the post-conversion code volume, the quantization step information 103 is modified such as to decrease the code volume generated in the encoder 2 at the time of the next processing.

This allows to determine the quantization step per processing unit in converting the picture encoding system.

If the transmission channel is at the VBR, and there is certain allowance in the band of the transmission channel, the volume of the codes generated in the encoder 2 may be increased to achieve the effective band utilization.

If, conversely, there is no allowance in the band of the transmission channel, the quantization step information 103 is determined such as to decrease the volume of the codes generated in the encoder 3.

The quantization step information 103 may also be determined using the encoding parameters 108 output from the decoder monitor in determining the quantization step.

The reason is that, taking the picture quality following the conversion of the picture encoding system, the pre-conversion picture properties can be equated to the post-conversion picture properties by performing the encoding using the quantization step obtained in the decoder 1 in performing the quantization in the encoder 2.

If the quantization step used in decoding significantly differs from the quantization step used in encoding, picture distortion tends to be produced.

The picture quality can be improved by determining the quantization step information 103 with the aid of the encoding parameters 108 output from the decoder monitor 51.

That is, control may be managed by performing fine adjustment, depending on the output buffer 40, pre-conversion code volume and on the post-conversion code volume, using the quantization step output from the decoder monitor as an initial value.

As the method for modifying the quantization step, use may be made of any of the conventional picture encoding systems, such as the quantization step modifying systems, e.g. H. 261, H. 261, or MPEG1, 2 or 4.

Figure 9:
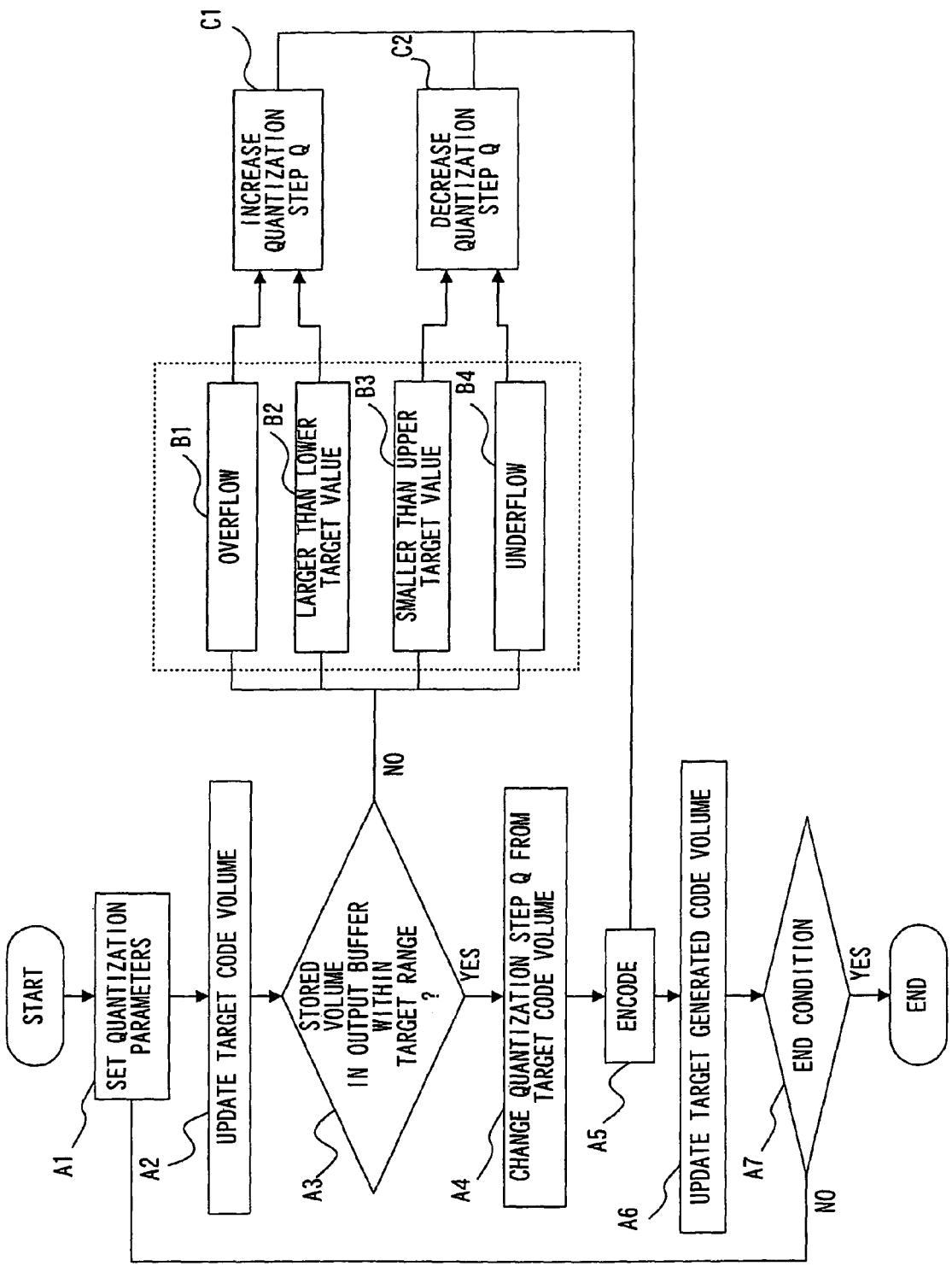
FIG. 9 is a flow diagram showing an embodiment for determining the quantization step.
Figure 10:
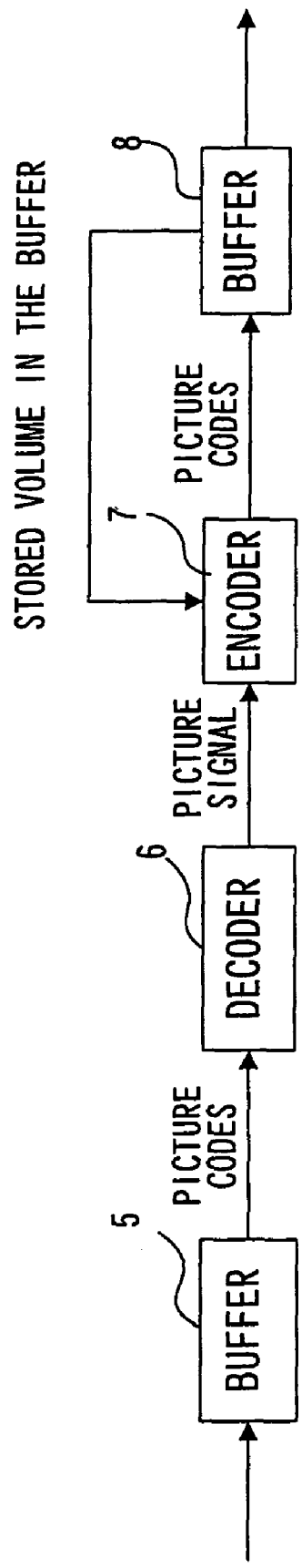
FIG. 10 shows the structure of a conventional picture encoding system conversion device.

FIG. 9 is a flow diagram showing a typical operation of the quantization step controller 74 in the fourth embodiment of the present invention.

At step A1, the quantization step is provisionally determined by the decoder operation information 102.

At step A2, the target code (generation) volume is set from the input buffer information 107 based on the pre-conversion code volume per encoding system conversion processing unit.

At step A3, it is verified whether or not the stored volume of the output buffer is within the target range. If the stored volume is within the target range, the quantization step controller 74 proceeds to step A4.

If the storage volume of the output buffer is verified at step A3 to be outside the target range, the quantization step controller 74 proceeds to step B1 top B4, depending on the storage volume.

At step A4, the quantization step Q is changed (modified) depending on the target code volume.

The quantization step information 103 is output at this time to the quantizer 33 of the encoder 2.

At step A5, the encoder 2 performs encoding using the quantization step information 103 mentioned above.

At step A6, the volume of the actually produced codes is determined from the output buffer information 109 to update the target code volume of the generated codes.

If, at step A7, the end condition is not met, the processing reverts to step A1 making up a loop.

If, at step A3, the storage volume of the output buffer is outside the target range (NO), processing branches to step B1 (overflow), step B2 (the storage volume being larger than the lower target value), step B3 (the storage volume being smaller than the upper target value) or to step B4 (underflow), depending on the stored volume of the output buffer. At steps B1 and B2, the processing transfers to step C1 to increase the quantization step Q, whereas, at steps B3 and B4, the processing transfers to step C2 to decrease the quantization step Q before transferring to step A5.

A fifth embodiment of the present invention is hereinafter explained. FIG. 5 shows the configuration of a code rate conversion device according to the fifth embodiment of the present invention.

Referring to FIG. 5, the fifth embodiment of the present invention includes a code rate conversion device 4 and a transcoder controller 3. The code rate conversion device 4 is made up of an input buffer 21, a variable length decoding (VLD) unit 22, an inverse-quantizer (IQ) 84, an adder 85, an inverse discrete cosine transform (IDCT) unit 86, a frame memory 87, a difference calculating unit (ADDER) 88 and a discrete cosine transform (DCT) unit 89. The transcoder controller 3 is made up of an input buffer monitor 52, an output buffer monitor 62 and a quantization step controller 71.

Referring to FIG. 5, the operation of the code rate conversion device, according to the fifth embodiment of the present invention, is explained in detail.

First, the operation of a code rate conversion device 5 is explained.

The input buffer 21 stores the bitstream, supplied thereto from outside, to output the stored bitstream to the VLD unit 22.

On the other hand, the input buffer monitor 52 is fed with the input buffer storage information 101.

The VLD unit 22 performs entropy decoding, such as variable length decoding or run-length decoding, on the bitstream output from the input buffer 21, to output decoded quantization transform coefficients to the inverse-quantizer (IQ) 23.

The encoding parameters 201, such as the motion vector or the prediction mode, are sent to the difference calculating unit 88 and to the VLC unit 83.

The inverse-quantizer 23 inverse-quantizes the quantized transform coefficients output from the VLD unit 22 to output the inverse-quantized transform coefficients.

The IDCT unit 24 performs IDCT matrix processing (calculations) coefficients on the transform coefficients output from the IQ unit 23 to output the transformed picture signals to the adder 81.

The adder 81 sums the signal output from the inverse-quantizer 23 and an output of the DCT unit 89 to output a resulting sum to the quantizer (Q) 82 and to the adder 85.

The quantizer 82 quantizes the transform coefficients output from the adder 81 to output resulting quantized transform coefficients to the VLC unit 83 and to the inverse-quantizer (IQ) 84.

The VLC unit 83 performs entropy decoding, such as variable length decoding or run-length decoding, on the quantized transform coefficients output from the quantizer 82, and on the encoding parameters 201, output from the VLD unit 22, to output the resulting encoded signals to the output buffer 40.

The inverse-quantizer (IQ) 84 inverse-quantizes the quantized transform coefficients, output from the quantizer 82, to output the resulting transform coefficients to the adder 85.

The adder 85 sums the transform coefficients, output from the inverse-quantizer 84, and the transform coefficients output from the adder 81, more specifically, negative values thereof, to output a resulting sum to the IDCT unit 86.

The IDCT 86 performs IDCT matrix calculations on the transform coefficients output from the adder 85 to output resulting picture signals to the frame memory 87.

The frame memory 87 stores the picture signals output from the IDCT unit 86.

The difference calculating unit (ADDER) 88 calculates the difference between a picture one frame before and the current picture to output the resulting difference to the DCT unit 89.

The DCT unit 89 performs DCT matrix calculations on the difference data output from the difference calculating unit 88 to output the resulting transform coefficients to the adder 81.

The output buffer 40 stores the encoded signals, output from the VLC unit 83, to send out the encoded signals to outside the device.

The operation of the transcoder controller 3, having an input buffer monitor 52, an output buffer monitor 62 and a quantization step controller 71, and configured for controlling the quantization step of the quantizer 82 by the quantization step controller 71, is similar to that of the above-described first embodiment and hence is not explained specifically.

A sixth embodiment of the present invention is now explained. FIG. 6 shows the structure of a code rate conversion device according to the sixth embodiment of the present invention. Referring to FIG. 6, the present sixth embodiment of the present invention includes, in addition to the structure of the above-described fifth embodiment, a decoder monitor 51, owned by the transcoder controller 3, for monitoring the VLD unit 22, with the quantization step controller 72 determining the quantization step information using the information output from the input buffer monitor 52, output buffer monitor 62 and decoder monitor 51. That is, the sixth embodiment of the present invention includes a code rate conversion device 4 and a transcoder controller 3. The code rate conversion device 4 is made up of an input buffer 21, a VLD unit 22, an inverse-quantizer (IQ) 23, an adder 81, a quantizer 82, a VLC unit 83, an inverse-quantizer (IQ) 84, an adder 85, an IDCT unit 86, a frame memory 87, a difference calculating unit 88 and a DCT unit 89. The transcoder controller 3 is made up of a decoder monitor 51, an input buffer monitor 52, an output buffer monitor 62 and a quantization step controller 73.

The operation of the code rate conversion device 4 is the operation of the fifth embodiment plus the operation of the VLD unit 22 outputting the encoding parameters 102 to the decoder monitor 51 of the transcoder controller 3.

The operation of the transcoder controller 3 is similar to that of the transcoder controller 3 in the above-described second embodiment and hence is not explained specifically.

A seventh embodiment of the present invention is now explained. FIG. 7 shows the structure of the code rate conversion device according to the seventh embodiment of the present invention. Referring to FIG. 7, the present seventh embodiment of the present invention includes, in addition to the structure of the above-described fifth embodiment, a reception side transmission channel monitor 53 for monitoring the reception side transmission channel, and a sending out side transmission channel monitor 63 for monitoring the sending transmission channel, both owned by the transcoder controller 3, with the quantization step controller 73 determining the quantization step information using the information output from the input buffer monitor 52, output buffer monitor 62, reception side transmission channel monitor 53 and the sending out side transmission channel monitor 63. That is, the sixth embodiment of the present invention includes a code rate conversion device 4 and a transcoder controller 3. The code rate conversion device 4 is made up of an input buffer 21, a VLD unit 22, an inverse-quantizer (IQ) 23, an adder 81, a quantizer 82, a VLC unit 83, an inverse-quantizer (IQ) 84, an adder 85, an IDCT unit 86, a frame memory 87, a difference calculating unit 88 and a DCT unit 89 The a transcoder controller 3 is made up of an input buffer monitor 52, a reception side transmission channel monitor 53, an output buffer monitor 62, a sending out side transmission channel monitor 63, and a quantization step controller 73.

The operation of the code rate conversion device 4 and the operation of the transcoder controller 3 are similar to those of the code rate conversion device 5 in the previous fifth embodiment, and the transcoder controller 3 in the previous third embodiment, respectively, and hence are not explained specifically.

An eighth embodiment of the present invention is now explained. FIG. 8 shows the structure of the code rate conversion device according to the eighth embodiment of the present invention. Referring to FIG. 8, the present eighth embodiment of the present invention includes, in addition to the structure of the above-described fifth embodiment, a decoder monitor 51 for monitoring the VLD unit 22, a reception side transmission channel monitor 53 for monitoring the reception side transmission channel, and a sending out side transmission channel monitor 63 for monitoring the sending transmission channel, these monitors 51, 53 and 63 being owned by the transcoder controller 3. The quantization step controller 73 determines the quantization step information using the information output from the input buffer monitor 52, output buffer monitor 62, reception side transmission channel monitor 53, decoder monitor 51 and the sending out side transmission channel monitor 63. That is, the present eighth embodiment of the present invention includes a code rate conversion device 4 and a transcoder controller 3. The code rate conversion device 4 is made up of an input buffer 21, a YLD unit 22, an inverse-quantizer (IQ) 23, an adder 81, a quantizer 82, a VLC unit 83, an inverse-quantizer (IQ) 84, an adder 85, an IDCT unit 86, a frame memory 87, a difference calculating unit 88 and a DCT unit 89. The transcoder controller 3 is made up of an input buffer monitor 52, a reception side transmission channel monitor 53, an output buffer monitor 62, a sending out side transmission channel monitor 63, and a quantization step controller 73.

The operation of the code rate conversion device 4 and the operation of the transcoder controller 3 are similar to those of the code rate conversion device 5 in the previous sixth embodiment and the transcoder controller 3 in the previous fourth embodiment, respectively, and hence are not explained specifically.

The meritorious effects of the present invention are summarized as follows.

As described above, the present invention gives the following meritorious effects:

The first effect of the present invention is that, since the time delay can be diminished, it is possible to realize encoding system conversion and code rate conversion suited to real-time communication.

The second effect is that, since the quantization may be achieved by feedback of the pre-conversion and post-conversion code volumes, the transmission channel band can be utilized most effectively, and the time delay produced in conversion can be diminished.

The third effect is that control is managed not only from the encoding parameters obtained after VLD, but also from the input buffer, output buffer and code volume etc., and hence a more flexible conversion may be achieved.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An encoding system conversion device for converting a signal encoded in one encoding system into a signal of another encoding system, comprising:
    a decoder unit being fed with a compression-coded signal in an input buffer to decode the signal in a variable length decoder;
    an encoder unit being fed with a signal output from said decoder unit, having an orthogonal transform unit orthogonally transforming the input signal, having a quantizer quantizing coefficients resulting from the orthogonal transform unit, and having a variable length encoder compression-encoding the quantized coefficients to output the compression-coded quantized coefficients from an output buffer; and
    a transcoder controller having:
    means for monitoring at least the state of said output buffer, and
    means for modifying a quantization step in said quantizer (a) to decrease the code volume generated in said encoder if the stored volume in said output buffer exceeds a preset value to produce overflow, and for modifying the quantization step in said quantizer (b) to increase the code volume generated in said encoder if the stored volume in said output buffer is not up to said preset value to produce underflow.

2. An encoding system conversion device for converting signal encoded in one encoding system into a signal of another encoding system, comprising:
    a decoder unit being fed with a compression-coded signal in an input buffer to decode the signal in a variable length decoder;
    an encoder unit being fed with a signal output from said decoder unit, having an orthogonal transforming the input signal, having a quantizer quantizing coefficients resulting from the orthogonal transformation, having a variable length encoder compression-encoding the quantized coefficients and having an output buffer outputting compression-coded quantized coefficients to the sending side transmission channel
    an input buffer monitor monitoring the state of said input buffer;
    an output buffer monitor monitoring the state of said output buffer;
    means for acquiring the information of said reception side transmission channel and the information of said sending side transmission channel; and
    a transcoder controller unit having a quantization step controller;
    said quantization step controller variably controlling quantization step of said quantizer, from the monitoring information for said input buffer and the monitoring information for said output buffer, based on the code volume per processing unit upon converting the picture encoding system, said variably controlling being performed in a fashion:
    (a) that, if the band of said reception side transmission channel is equal to that of said sending side transmission channel, the pre-conversion code volume will be equal to the post-conversion code volume, and
    (b) that, if the band of said reception side transmission channel is different from that of said sending side transmission channel, the post-conversion code volume will coincide with the
    pre-conversion code volume multiplied with a ratio between bands of said reception side transmission channel and said sending side transmission channel.

3. The encoding system conversion device as defined in claim 1
    wherein
    said transcoder controller unit further includes a decoder monitor fed with encoding parameters output from said variable length decoder;
    said quantization step controller determining the quantization step of said quantizer using said encoding parameters.

4. The encoding system conversion device as defined in claim 2
    wherein
    said transcoder controller unit further includes a decoder monitor fed with encoding parameters output from said variable length decoder;
    said quantization step controller determining the quantization step of said quantizer using said encoding parameters.

5. The encoding system conversion device as defined in claim 3
    wherein
    the quantization step of said quantizer is finely adjusted, with the quantization step output from said decoder monitor, as an initial value, responsive to the state of said output buffer, pre-conversion code volume and said post-conversion code volume.

6. The encoding system conversion device as defined in claim 4
    wherein
    the quantization step of said quantizer is finely adjusted, with the quantization step output from said decoder monitor, as an initial value, responsive to the state of said output buffer, pre-conversion code volume and said post-conversion code volume.

* * * * *